Figure 1:
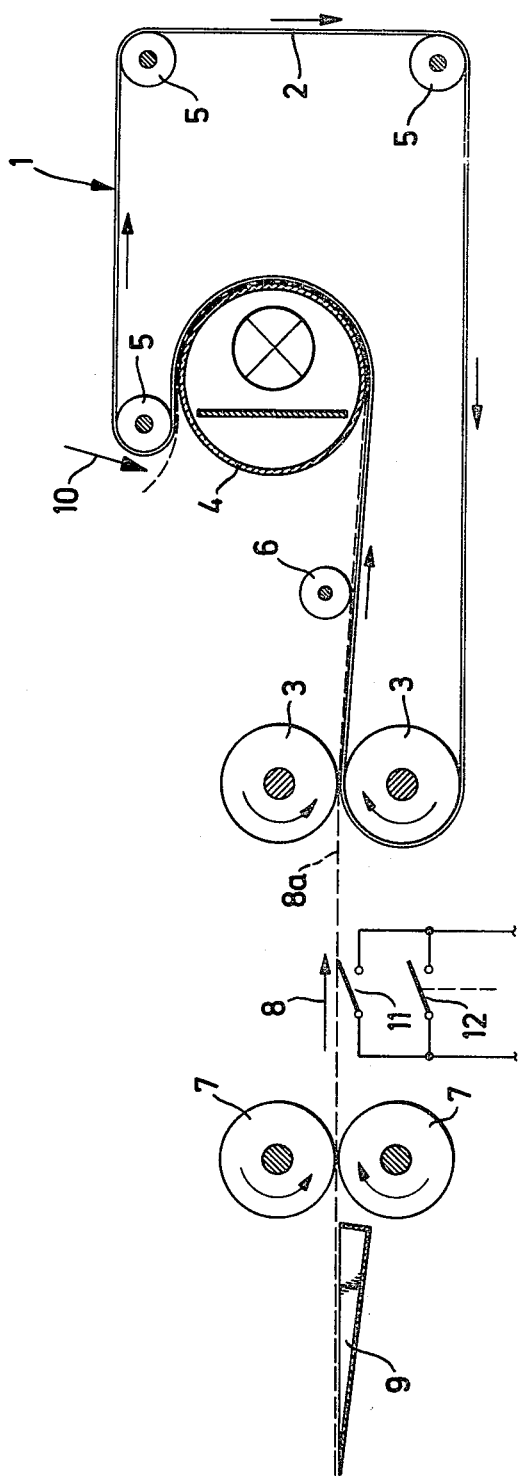

United States Patent [19]

Schröter

[11] 4,140,310
[45] Feb. 20, 1979

[54] FEEDER MECHANISM AT AN EXPOSURE STATION OF A PHOTOPRINTING MACHINE

[75] Inventor: Herbert Schröter, Taunusstein, Fed. Rep. of Germany

[73] Assignee: Hoechst Aktiengesellschaft, Fed. Rep. of Germany

[21] Appl. No.: 818,874

[22] Filed: Jul. 25, 1977

[30] Foreign Application Priority Data

Jul. 28, 1976 [DE] Fed. Rep. of Germany ....... 2633851

[51] Int. Cl.² .......................... B65H 5/34; B65H 7/02
[52] U.S. Cl. ..................................... 271/265; 271/270
[58] Field of Search ................................ 271/270, 265

[56] References Cited

U.S. PATENT DOCUMENTS

| | | | |
|---|---|---|---|
| 3,716,294 | 2/1973 | Knechtel | 271/265 X |
| 3,833,214 | 9/1974 | Zawiski | 271/270 |
| 3,936,041 | 2/1976 | Shiina | 271/265 X |

Primary Examiner—Richard A. Schacher
Attorney, Agent, or Firm—James E. Bryan

[57] ABSTRACT

This invention relates to an improvement in a feeder mechanism at an exposure station of a photoprinting machine, in which a transport device is connected to a first rotary drive for transporting a copying material through the exposure station and in which a second rotary drive is provided which may be operated at variable speeds relative to the speed of the first rotary drive and which is connected to a roller at the beginning of the transport path of an original to be copied, the improvement comprising an additional pair of preceding rollers positioned in the transport path of the original upstream of the transport device in the direction of transport, means connecting said pair of preceding rollers to said variable speed second rotary drive which may be switched in order to drive said pair of preceding rollers optionally at a speed corresponding to the transport speed of the transport device or at a lower speed, switching means in the transport path between said pair of preceding rollers and the transport device, means connecting said switching means to the variable speed rotary drive of the pair of preceding rollers whereby their speed is lower than the transport speed as long as the switching means are in a first switching position, not actuated by an original, and the speed of the preceding rollers corresponds to the transport speed when the switching means are changed to a second switching position by an original to be copied.

7 Claims, 4 Drawing Figures

FEEDER MECHANISM AT AN EXPOSURE STATION OF A PHOTOPRINTING MACHINE

This invention relates to a feeder mechanism at an exposure station of a photoprinting machine.

In modern photoprinting machines, the problem may arise that the speed for transporting the copying material through the exposure station is so high that it will become difficult to manually feed in the original, because it is nearly snatched out of the operator's hand when it is inserted into the machine.

In order to solve this problem, it might be considered to use automatic feeding devices into which the originals are placed in a stationary position to be picked up for copying, as required. However, such auxiliary equipment is not easily fabricated and it is also rather expensive.

It is an object of the present invention to provide a feeder mechanism at an exposure station of a photoprinting machine, into which the originals are easily and safely fed by hand, in particular in case of a high transport speed of the copying material. In the feeder mechanism, the conventional transport means, which, e.g., comprises feed rollers and endless transport belts connected to these feed rollers, should be utilized as far as possible to keep the cost of fabrication of the inventive feeder mechanism relatively low. Further, the feeder mechanism should not impose additional mechanical stresses upon the originals, and it should ensure safe operation at reduced maintenance costs.

These objects are achieved by utilizing, among others, a characteristic known in connection with the elimination of troublesome phenomena which may be caused by the endless transport belts of a feeder mechanism at an exposure station of a photoprinting machine (German Offenlegungsschrift No. 1,965,834). Usually, the endless transport belts of the transport devices in photoprinting machines are driven by a driving roller, designed as a deviating roller connected to a rotary drive. The copying cylinder, the deviating rollers as well as the feed roller are free-wheeling. Entrainment, in particular of the copying cylinder, is ensured by tightening rollers which tighten the transport belts. The copying material or the original, respectively, is transported at a constant speed throughout the device, and the speed is determined by the driving roller which is always in contact with the transport belts.

In such photoprinting machines the copying material may become creased during feeding-in, when there is excessive tension between the transport belts and the copying cylinder on the feeding side. If, on the other hand, tension is insufficient, the photoprints exhibit a so-called "doubling." In order to eliminate these troublesome phenomena, a tension is built up at the input end, which tension may be adjusted independently of the tension produced by the driving roller, by providing the feed roller with a rotary drive of its own which is adjustable relative to the drive of the driving roller and which is set to a higher transport speed than the driving roller. The difference in speed and, consequently, the reduced tension of the transport belts on the feeding side of the copying cylinder may be manually adjusted.

In the known feeder mechanism, the second rotary drive influences the same transport belts as the usual first rotary drive, whereas according to the present invention the second rotary drive does not act upon the normal transport device or, more particularly, upon the transport belts, if any, of the normal transport device. The second rotary drive is, in this case, connected to an additional pair of preceding rollers. Further, provisions are made to run the second rotary drive, under certain conditions and during particular stages of the feeding operation, at a lower speed than the first rotary drive. Before the original or the copying material, respectively, is seized by the normal transport device the second rotary drive is automatically stepped up to the speed of the normal transport device. For this purpose, switching means are arranged in the transport path of the original between the transport device and the pair of preceding rollers, which switching means are connected to the variable-speed second rotary drive or its control means, respectively. "In the transport path" connotes in this connection that the switching means are actuatable by the original, e.g., by an actuating element of a switch extending into the transport path.

The mode of operation of the inventive feeder mechanism is based on the principle that in case of a transport speed of the actual transport device which exceeds a predetermined limiting speed, the pair of preceding rollers runs at a relatively low speed during feeding-in of the original, so that this operation may be easily and safely performed. The copying material is pulled in by the preceding rollers, and as soon as it arrives at the switching means between the preceding rollers and the transport device, the second rotary drive is accelerated until the speed of the copying material corresponds to the circumferential speed of the feed rollers of the transport device. Thus, no additional mechanical stress is produced in the original, when it enters into the transport device. Only after the original has passed the switching means are the pair of preceding rollers switched back to a relatively lower speed. This means that the preceding rollers run at the same speed as the transport device during one stage of operation of the feeder mechanism, whereas they run at a reduced speed during other stages of operation.

Consequently, it is possible to maintain the high transport speed of the transport device and, at the same time, feed in the copying material safely and easily. When the inventive mechanism is employed, the conventional transport devices may be used to a large extent; it is primarily necessary to provide the pair of preceding rollers as well as pertinent driving means. The additional expenditure for this feeder mechanism is, therefore, relatively moderate.

The invention is based on the assumption that the actual transport device operates at a speed which is too high for safe and easy feeding-in of the copying material. When the transport speed is adjustable, however, as is normal in photoprinting machines, so that the original may be fed into the feeder mechanism without difficulty, during operation of the machine in a lower speed range, a further embodiment of the invention is particularly advantageous.

In the further embodiment, the pair of preceding rollers runs at a lower speed than the transport device, only as long as the transport speed exceeds a predetermined value, and as long as the copying material has not yet arrived at the transport device. In contrast, the preceding rollers run at the same speed as the transport device when the transport speed of the transport device is below a predetermined value or when the copying material — even in case of a high transport speed — has arrived at the transport device. As a result, feeding-in of the original can be performed at speeds at which an undiminished efficiency of the feeder mechanism is maintained and, at the same time, safe and easy feeding-in is ensured, irrespective of high transport speeds.

In a particularly useful embodiment of the feeder mechanism the speed of the pair of preceding rollers is maintained at a constant, relatively low value, when the transport speed, which exceeds a predetermined value, e.g. varies as a function of the transparency of the original to be copied.

In a further embodiment of the feeder mechanism, on the other hand, also the speed of the pair of preceding rollers is adjustable in accordance with the transmission ratios, similar to the transport speed of the transport device. This embodiment is advantageous because it operates with one driving motor only, which serves to drive the pair of preceding rollers as well as the transport device.

All of the above-described feeder mechanisms have the advantage that they permit a variation of the transport speed, especially as a function of the transparency of the original. Transparency is measured by means of a conventional control device comprising a photosensitive element positioned at the path of the original and connected to an amplifier. The control current supplied by the amplifier depends upon the transparency of the original, measured by the photosensitive element.

In order to obtain a precise measurement of the transport speed, which determines a change of speed of the preceding rollers, a tacho-generator is advantageously coupled with the transport device and is in electroconductive connection with a limit indicator. The limit indicator may comprise an electrical circuit arrangement, linked to an adjustable switching element in such a manner that it supplies a particular output signal when the tacho-generator voltage exceeds a preset value, and emits another output signal when the tacho-generator voltage remains below the preset value.

Figure 2:
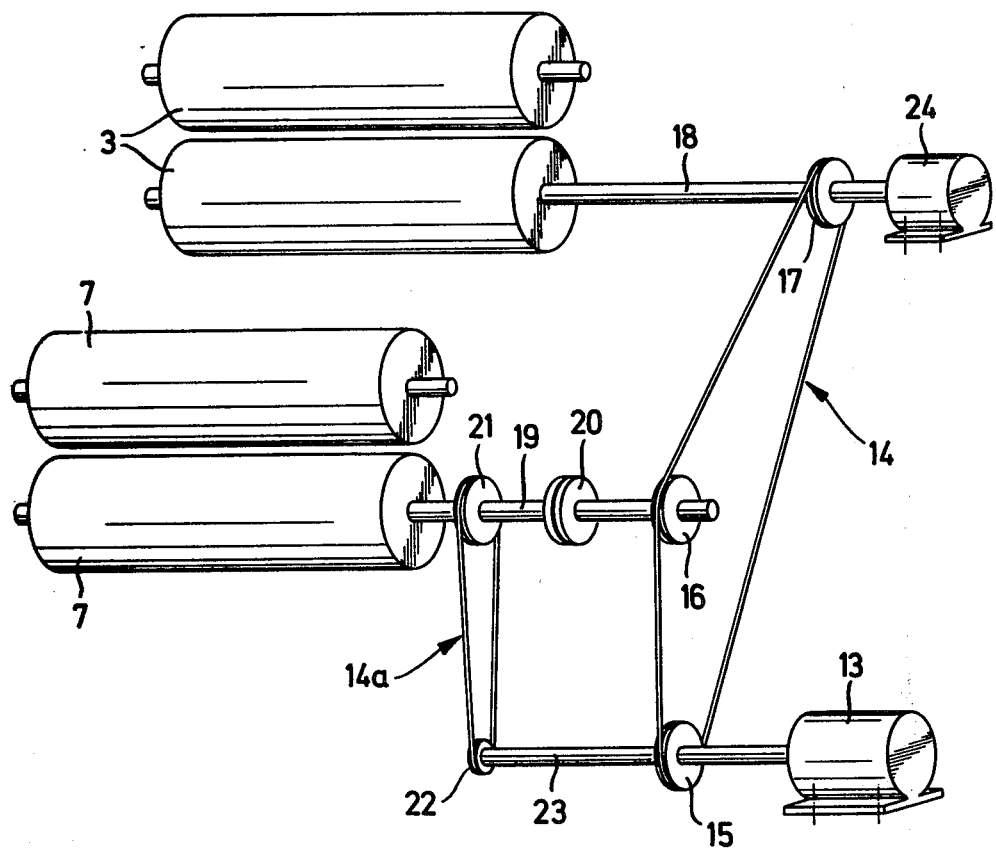
Figure 3:
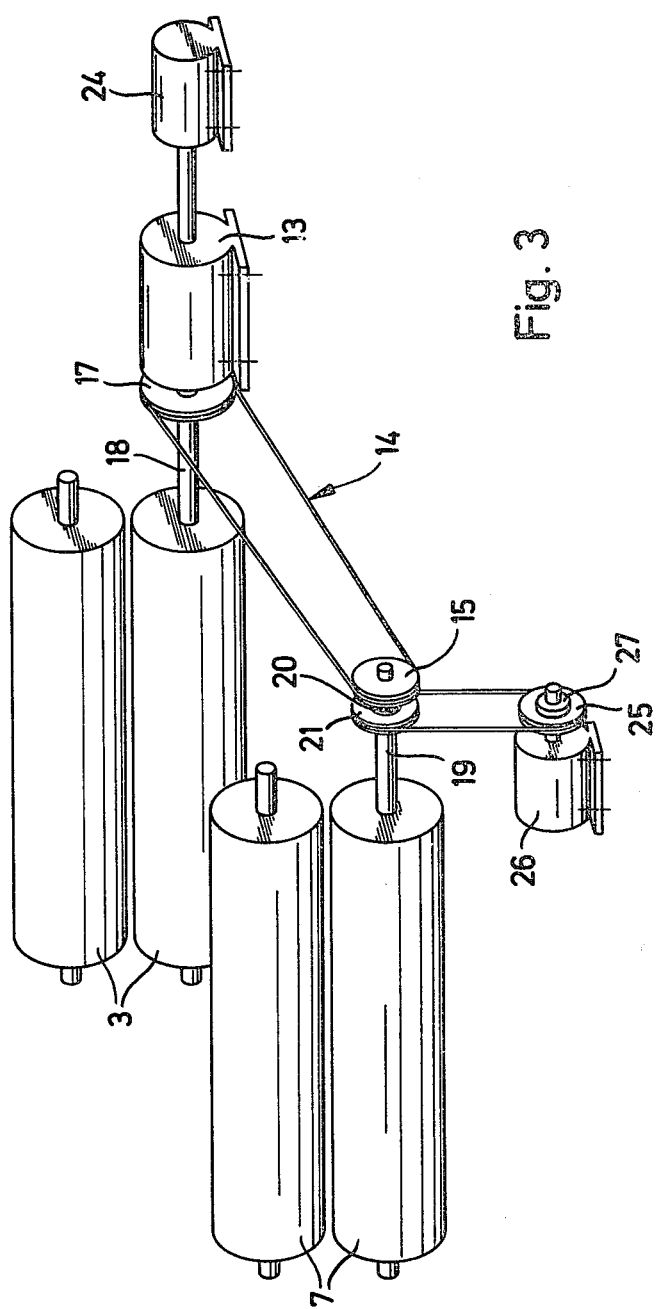
Figure 4:
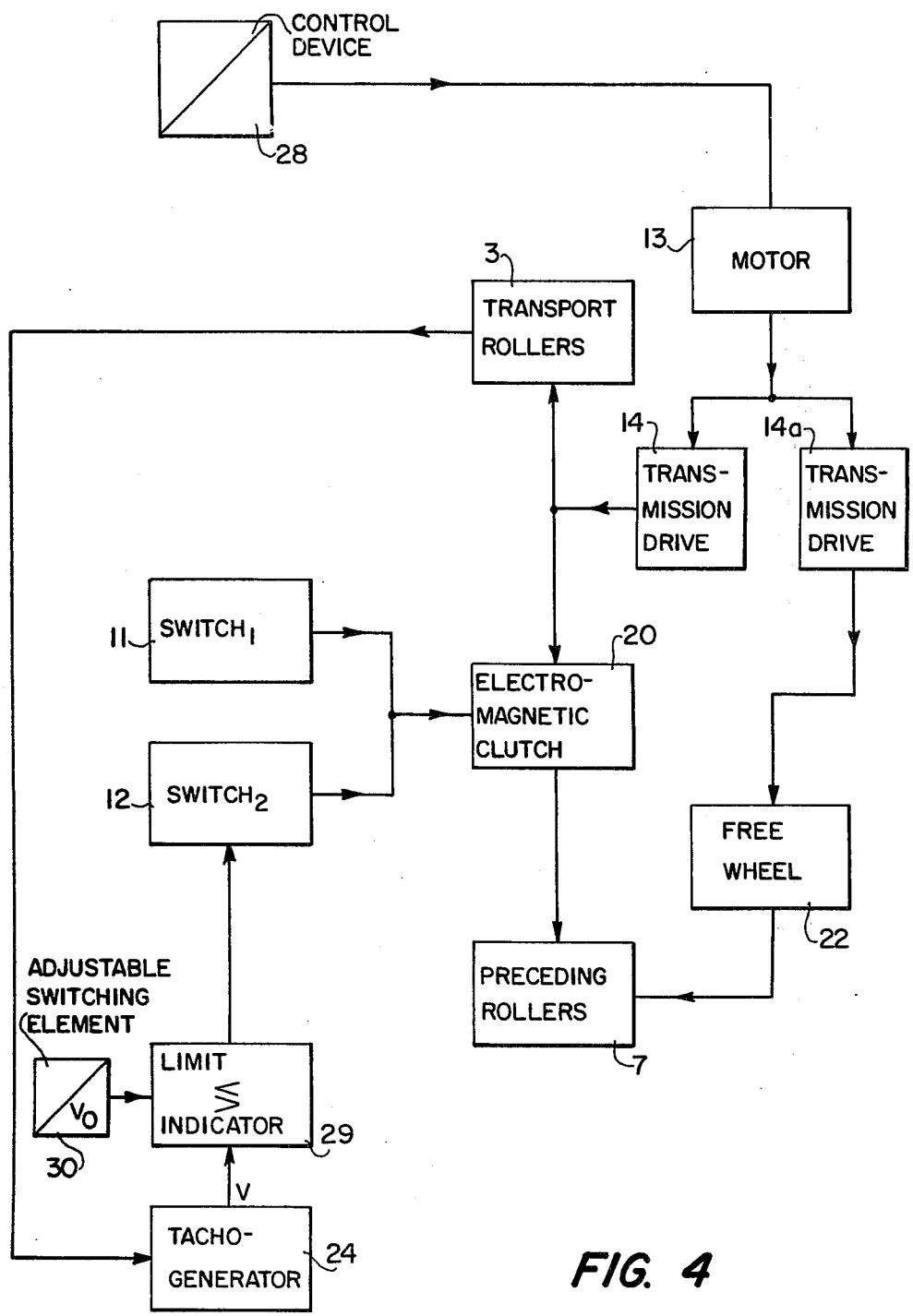

The invention will be further illustrated by reference to the accompanying drawings, in which:

FIG. 1 is a diagrammatic view of a feeder and transport mechanism at an exposure station of a photoprinting machine, FIG. 2 is a perspective view of the mechanical elements of the feeder mechanism incorporated in a first embodiment, FIG. 3 shows the mechanical elements in a second embodiment of the feeder mechanism, and FIG. 4 is a block diagram, showing essential mechanical and electrical structural groups or elements, respectively, as connected according to the signal flow.

FIG. 1 shows the transport device of a photoprinting machine in the area of the exposure station, generally denoted by the reference numeral 1. The device comprises an endless transport belt 2 which is led from a pair of transport rollers 3 around part of the circumference of a copying cylinder 4 as well as around the deviating rollers 5. A pressure roller 6 is arranged between the pair of transport rollers 3 and the copying cylinder 4.

The feeder mechanism includes a pair of preceding rollers 7. The pair of preceding rollers 7 are positioned upstream of the pair of transport rollers, relative to the direction of transport of the copying material, as indicated by an arrow 8. Further, a feed table 9 is placed in front of the pair of preceding rollers in the direction of transport. The original may be fed over this feed table for insertion between the preceding rollers. A feeding device for the copying material is also provided in the area of the transport device; it is, however, not shown in the drawing. An output station for the copying material, indicated by an arrow 10, is provided behind the copying cylinder in the direction of transport. At this output station, the exposed copying material is separated from the original, and is subsequently developed in another part of the machine, not shown.

FIG. 1 further shows a switch 11, arranged between the pair of preceding rollers 7 and the pair of transport rollers 3 in the area of the transport path of the original, indicated by a dotted line. This switch may be mechanically actuated by the original. Alternative switching means are feasible which may, e.g., be composed of a photosensitive cell connected to an amplifier which is linked to a switching relay. The switch 11 is electrically connected in parallel to a second switch 12. As explained below by reference to FIG. 4, the switch 12 is actuated in accordance with the respective transport speed of the transport device 1.

FIG. 2 shows how the pair of transport rollers 3 and the pair of preceding rollers 7 are connected to their driving means.

A driving motor 13 is connected to a shaft 18 of one of the two transport rollers 3 by means of a transmission drive belt 14 and the pulleys 15, 16 and 17. These elements constitute the first rotary drive. Via a shaft 19 and an electromagnetic clutch 20, which are also parts of the second variable-speed rotary drive, the pair of preceding rollers may be connected to the transmission drive 14. The second rotary drive provided for the pair of preceding rollers 7 further includes a pulley 21 mounted on the shaft 19 and a free wheel 22 mounted on the shaft 23 of the driving motor 13. The diameters of the pulleys 15, 16 and 17 on the one hand and of the pulley 21 and the free wheel 22 on the other hand are chosen in such a way that the reduction of the rotary movement of the motor 13 between the pulley 21 and the free wheel 22 exceeds the reduction between the pulleys 15, 16 and 17.

FIG. 2 also shows a tacho-generator 24 connected to the shaft 18 of the pair of transport rollers.

FIG. 3 shows an alternative embodiment of the feeder mechanism, in which identical parts are denoted by the same reference numerals as used in FIG. 2. The embodiment according to FIG. 3 differs from the embodiment in FIG. 2 as follows:

The driving motor 13 is directly connected to the shaft 18 of one of the transport rollers 3, and it represents the first rotary drive of the transport rollers. In addition, it is possible to connect the driving motor 13, which hereinafter is called "the first driving motor," to the shaft 19 of the pair of preceding rollers 7 via a transmission drive belt 14 and the pulleys 15 and 17, and via the electromagnetic clutch 20. The shaft 19 is also connected to a second driving motor 26 via the pulley 21 and the pulley 25, with a free wheel 27 arranged between the pulley 25 and the motor shaft of the second driving motor 26. Together with the free wheel 27 and the pulleys 25 and 21 as well as with the elements of the first rotary (see above), which act on the pair of preceding rollers, the second driving motor 26 constitutes the second rotary drive for the pair of preceding rollers. The tacho-generator 24 is in connection with the pair of transport rollers 3.

In the alternative embodiment according to FIG. 3 the transmission ratios chosen also ensure that the pair of preceding rollers 7 may be driven at a lower speed by the second driving motor 26 than the pair of transport rollers 3 by the first driving motor 13.

Referring to FIGS. 1, 2 and 3 it is further pointed out that guiding elements, not shown in the drawings, are positioned between the pair of transport rollers and the pair of preceding rollers. These guiding elements ensure that the copying material leaving the gap between the preceding rollers is safely fed into the gap between the transport rollers.

The block diagram in FIG. 4 refers to the arrangement of the mechanical elements according to FIG. 2. As indicated in the diagram, the driving motor 13 is supplied with power by a control device 28 provided for transparency measurement. The diagrammatic representation in FIG. 4 does not show that the control device includes a photosensitive element which is positioned in the transport path of the originals and is struck by a light beam which has passed the original. The output of the photosensitive element is connected to an amplifier supplying a voltage corresponding to the transparency of the original to be copied. This voltage is fed into the driving motor 13. Two transmission drives 14 and 14a branch off from the mechanical output (shaft) of the driving motor. The transmission drive 14, which is adapted for "faster" transmission than the transmission drive 14a, is constantly in contact with the pair of transport rollers 3. In addition, the transmission drive 14 is optionally connectable to the pair of preceding rollers 7 via the electromagnetic clutch 20. The second transmission drive 14a, on the other hand, can act on the pair of preceding rollers 7 via the free wheel 22, when the clutch 20 is not engaged and the pair of preceding rollers are disconnected from the transmission drive 14.

The clutch 20 is controlled by the switch 11 disposed in the transport path 8a, as shown in FIG. 1, as well as by the switch 12 arranged in parallel with the switch 11 and actuated by a limit indicator 29. The tacho-generator 24 is connected to the input of the limit indicator 29. The limit value of the limit indicator may be preset by means of the adjustable switching element 30.

The mode of operation of the alternative embodiment of the feeder mechanism in accordance with FIGS. 2 and 4 will now be described.

In FIG. 1, which serves as a common illustration for the two alternative embodiments according to FIGS. 2 and 3, the original is fed over the feed table 9 and is inserted between the preceding rollers 7.

During this operational stage, the speed of the preceding rollers depends upon the transport speed of the transport device 1. The transport speed, in turn, is determined according to the result of the transparency measurement by the control means 28, as indicated in FIG. 4, which control means supplies voltage to the driving motor 13. The transport speed or the rotational speed, respectively, of the pair of transport rollers is determined by the tacho-generator 24. If the transport speed v is below a value $v_o$ given by the adjustable switching element 30, the pair of preceding rollers is allowed to rotate at the same speed as the pair of transport rollers. In this case, the switch 12 is closed so that the electromagnetic clutch 20 between the transmission drive 14 and the pair of preceding rollers 7 engages. The slower rotational movement resulting from the transmission ratio of the transmission drive 14a has no effect on the pair of preceding rollers, due to the free wheel. When the original arrives at the switch 11 this switch is closed, but it does not release any further action since the clutch 20 is already engaged. Consequently, the original is fed to the pair of transport rollers at a speed corresponding to the transport speed of the copying material on its way through the exposure station.

In another case, e.g., measurement of transparency at the control device 28 indicates that the pair of transport rollers 3 are driven at a speed v which is higher than the limiting speed $v_o$. This is again registered by the limit indicator 29 and, in this instance, the output signal of the limit indicator causes opening of the switch 12, so that the electromagnetic clutch 20 is not supplied with current and the transmission drive 14 and the pair of preceding rollers 7 are no longer coupled. Now, the transmission drive 14a can act via the free wheel 22, and the pair of preceding rollers are driven at a lower speed than the pair of transport rollers 3. The leading edge of the original is relatively gently taken up by the pair of preceding rollers and the original is conveyed into the space between the pair of preceding rollers and the pair of transport rollers, up to the switch 11. The switch 11 is then closed and, as a result, the electromagnetic clutch 20 is activated and couples the transmission drive 14 to the pair of preceding rollers. The rotational movement of the pair of preceding rollers is accelerated by the transmission drive 14, and the preceding rollers will soon — at any rate, the moment the copying material enters into the gap between the pair of transport rollers — rotate at the same speed as the transport rollers 3. As a result, the original is not subjected to any significant tension when it is taken up by the transport rollers and is conveyed to the exposure station. Synchronized rotation of the pair of preceding rollers and the pair of transport rollers is maintained until the copying material has been pulled past the switch 11, always on the condition that the rotational speed of the pair of transport rollers 3 exceeds the given limit value $v_o$.

A basically similar mode of operation is obtained by the alternative embodiment according to FIG. 3, however, in this embodiment the preceding rollers are driven at a constant speed, irrespective of variations in the transport speed of the pair of transport rollers. For this purpose, the pair of preceding rollers are provided with a driving motor 26 of their own. The technical data of the second driving motor and the transmission ratios of the transmission drive are chosen in such a way that the preceding rollers are driven at a constant speed which is lower than the speed of the transport rollers when the speed of the transport rollers exceeds the preset limit value $v_o$.

It will be obvious to those skilled in the art that many modifications may be made within the scope of the present invention without departing from the spirit thereof, and the invention includes all such modifications.

What is claimed is:

1. In a feeder mechanism at an exposure station of a photoprinting machine, in which a transport device is connected to a first rotary drive for transporting a copying material through the exposure station and in which a second rotary drive is provided which may be operated at variable speeds relative to the speed of the first rotary drive, the improvement comprising an additional pair of preceding rollers positioned in the transport path of the original upstream of the transport device in the direction of transport, means connecting said pair of preceding rollers to said variable speed second rotary drive which may be switched in order to drive said pair of preceding rollers optionally at a speed corresponding to the transport speed of the transport device or at a lower speed, switching means in the transport path between said pair of preceding rollers and the transport device, means connecting said switching means to the variable speed rotary drive of the pair of preceding rollers whereby their speed is lower than the transport speed as long as the switching means are in a first switching position, not actuated by an original, and the speed of the preceding rollers corresponds to the transport speed when the switching means are changed to a second switching position by an original to be copied.

2. A feeder mechanism according to claim 1 including second switching means connected in parallel with said first switching means in the path of the original, means connecting said second switching means to limit indicator means, and means connecting said limit indicator means to the transport device, said limit indicator means causing the second switching means to adopt a first switching position in which the speed of the preceding rollers is adjusted to the speed of the transport rollers, as long as the transport speed is below a preset limit value, and causing the second switching means to adopt to second switching position in which the preceding rollers are set to a lower speed than the transport device, as long as the transport speed exceeds the given limit value.

3. A feeder mechanism according to claim 1 in which said first rotary drive includes a first driving motor constantly connected to the transport device, electromagnetic clutch means connected to the first driving motor by a driving part and connected to the pair of preceding rollers by a driven part, and said second rotary drive including a second driving motor supplied with current independently of the first driving motor, and free wheel means connecting said second driving motor to the driven part of the clutch.

4. A feeder mechanism according to claim 1 including a common driving motor for the two rotary drives, first transmission drive means constantly connecting said motor to said transport device, said motor being connectable to the pair of preceding rollers by said first transmission drive means and by a clutch, and second transmission drive means and free wheel means constantly connecting said motor with a driven part of the clutch at one of the preceding rollers.

5. A feeder mechanism according to claim 3 including a control device which supplies a control current to the first driving motor in dependence upon the transparency of the original to be copied.

6. A feeder mechanism according to claim 4 including a control device which supplies a control current to the common driving motor in dependence upon the transparency of the original to be copied.

7. A feeder mechanism according to claim 2 including a tacho-generator connected to the transport device and electrically connected to the limit indicator means.

* * * * *